United States Patent
Hanson

(10) Patent No.: US 8,048,487 B2
(45) Date of Patent: Nov. 1, 2011

(54) ORGANOMETALLIC FILMS, METHODS FOR APPLYING ORGANOMETALLIC FILMS TO SUBSTRATES AND SUBSTRATES COATED WITH SUCH FILMS

(75) Inventor: Eric L. Hanson, San Diego, CA (US)

(73) Assignee: Aculon, Inc., San Diego, CA (US)

( * ) Notice: Subject to any disclaimer, the term of this patent is extended or adjusted under 35 U.S.C. 154(b) by 1021 days.

(21) Appl. No.: 11/985,150

(22) Filed: Nov. 14, 2007

(65) Prior Publication Data

US 2008/0131701 A1 Jun. 5, 2008

Related U.S. Application Data

(60) Provisional application No. 60/859,193, filed on Nov. 15, 2006.

(51) Int. Cl.
*B05D 1/36* (2006.01)
(52) U.S. Cl. ............... 427/383.1; 427/383.3; 427/383.5; 427/383.7; 427/419.1; 427/419.8
(58) Field of Classification Search .................. None
See application file for complete search history.

(56) References Cited

U.S. PATENT DOCUMENTS

| | | | |
|---|---|---|---|
| 2,768,909 A | 10/1956 | Haslam | 117/121 |
| 2,984,641 A | 5/1961 | Wolinski | 260/41 |
| 3,057,753 A | 10/1962 | Blatz | 117/121 |
| 4,931,316 A * | 6/1990 | Johnson | 427/227 |
| 5,352,485 A | 10/1994 | DeGuire et al. | 427/226 |
| 5,638,479 A | 6/1997 | Takami et al. | 385/124 |
| 5,879,757 A | 3/1999 | Gutowski et al. | 427/491 |
| 6,146,767 A | 11/2000 | Schwartz | 428/457 |
| 6,395,341 B1 | 5/2002 | Arakawa et al. | 427/419.1 |
| 6,645,644 B1 | 11/2003 | Schwartz et al. | 428/632 |
| 6,737,145 B1 | 5/2004 | Watanabe et al. | 428/64.4 |
| 6,965,001 B2 | 11/2005 | Arakawa et al. | 525/474 |
| 2002/0037481 A1* | 3/2002 | Lee et al. | 430/396 |
| 2002/0076495 A1* | 6/2002 | Maloney et al. | 427/272 |
| 2002/0094436 A1 | 7/2002 | Ohtake et al. | 428/333 |
| 2003/0104129 A1 | 6/2003 | Mino et al. | 427/346 |
| 2003/0130127 A1 | 7/2003 | Hentges et al. | 505/100 |
| 2006/0159923 A1 | 7/2006 | Becker-Willinger et al. | 428/403 |
| 2007/0092640 A1* | 4/2007 | Bruner et al. | 427/157 |
| 2007/0092735 A1* | 4/2007 | Bruner et al. | 428/432 |
| 2008/0166470 A1* | 7/2008 | Schwartz et al. | 427/2.27 |

FOREIGN PATENT DOCUMENTS

EP 1559810 A2 * 8/2005
GB 2 208 874 A 4/1989

* cited by examiner

*Primary Examiner* — Erma Cameron
(74) *Attorney, Agent, or Firm* — William J. Uhl

(57) ABSTRACT

Organometallic coatings or films, substrates coated with such films and methods for applying the films to the substrates are disclosed. The organometallic film or coating is derived from a transition metal compound containing both halide ligands and alkoxide ligands. Coated articles comprising polymer substrates and adhered to the substrate surface an organometallic film in which the metal comprises halide and alkoxide ligands are also disclosed.

12 Claims, No Drawings

US 8,048,487 B2

ORGANOMETALLIC FILMS, METHODS FOR APPLYING ORGANOMETALLIC FILMS TO SUBSTRATES AND SUBSTRATES COATED WITH SUCH FILMS

CROSS REFERENCE TO RELATED APPLICATION

The present application claims priority from U.S. Provisional Patent Application Ser. No. 60/859,193, filed Nov. 15, 2006.

FIELD OF THE INVENTION

The present invention relates to organometallic films, to methods of applying such films to surfaces of various substrates and to substrates coated with organometallic films.

BACKGROUND OF THE INVENTION

Self-assembled films or layers on various substrates are well known in the art. These films or layers typically have functional groups (head groups) that bond to a cofunctional group on the substrate surface and organo groups that have some mutual attraction to neighboring molecules in the layer (s) or to the surface. The self-assembled films are used in various applications such as for medical and electrical use. In medical applications, the self-assembled films are used to form an interfacial layer between a titanium orthopedic implant and the surrounding body tissue. For electrical applications, the self-assembled films are useful for improving the performance of devices that incorporate organic-inorganic interfaces such as those found in organic light-emitting diodes. An example of a self-assembled organic layer is disclosed in U.S. Pat. No. 6,645,644 in which an organometallic compound such as a titanium or zirconium transition metal alkoxide is applied to a substrate such as a metal having a native oxide surface. The alkoxide groups react with the oxide groups forming a secure surface bond. The free or unreacted alkoxide groups are available for reaction with reactive groups such as acid groups in a subsequently applied layer.

Unfortunately, such organometallic coatings often have poor durability and are easily removed from many substrates, particularly polymer substrates such as polycarbonates and polysiloxanes.

It would be desirable to provide an organometallic coating derived from a transition metal alkoxide that has better durability and adhesion to various substrates, particularly polymer substrates.

SUMMARY OF THE INVENTION

The present invention provides a method of depositing an organometallic coating to a substrate comprising:
(a) contacting the surface of the substrate with a transition metal compound having both halide and alkoxide ligands so as to deposit a film on the substrate,
(b) exposing the film to conditions sufficient to form a polymeric metal oxide film with alkoxide and hydroxyl ligands.

The present invention also provides for organometallic films or coatings comprising a polymeric transition metal oxide with alkoxide, hydroxyl ligands and halide ligands.

The present invention also provides for coated polymer substrates having adhered to the substrate surface an organometallic film comprising ligands selected from halide and alkoxide.

The organometallic film can act as an anchor for functional coatings (e.g. hydrophobic, antifog, antistatic, conductive, etc.), or as an adhesion promoter at organic/organic, organic/inorganic interfaces (e.g. as an adhesion promoter at a polyimide/polyester interface).

DETAILED DESCRIPTION

The organometallic compound used in the method of the invention is preferably derived from a transition metal selected from Group IIIB of the Periodic Table or a transition metal selected from Group IVB, VB and VIB of the Periodic Table. Preferred transition metals are titanium, zirconium, lanthanum, hafnium, tantalum and tungsten. The organo portion of the organometallic compound contains ligands comprising both alkoxides and halides. Examples of suitable alkoxide groups are those containing from 1 to 18, preferably 2 to 8 carbon atoms, such as ethoxide, propoxide, isopropoxide, butoxide, isobutoxide and tert-butoxide. Examples of suitable halides are fluoride and chloride. Other ligands such as acetyl acetonates may also be present.

The organometallic compounds can be esters and polymeric forms of the esters. With reference to titanium and zirconium, examples of various compounds include a. alkyl esters of titanium and zirconium having the general formula $(X)_{4-y}$-$M(OR)_y$, wherein M is selected from Ti and Zr; X is selected from fluorine and chlorine; R is $C_{1-18}$ alkyl and y=2 to 3, b. polymeric alkyl titanates and zirconates obtainable by condensation of the alkyl esters of (a), i.e., partially hydrolyzed alkyl esters of the general formula RO[-M(OR)(X)O—]$_y$R, wherein M, R and X are as above and y is a positive integer, and c. mixtures of (a) and (b).

The organometallic compounds may be used neat and applied under vacuum by chemical vapor deposition techniques or it may be dissolved or dispersed in a diluent and applied by coating techniques described below. Examples of suitable diluents are alcohols such as methanol, ethanol and propanol, aliphatic hydrocarbons, such as hexane, isooctane and decane, ethers, for example, tetrahydrofuran and dialkylethers such as diethylether.

Also, adjuvant materials may be present in the organometallic composition. Examples include stabilizers such as sterically hindered alcohols, surfactants and anti-static agents. The adjuvants if present are present in amounts of up to 30 percent by weight based on the non-volatile content of the composition.

The concentration of the organometallic compound in the composition is not particularly critical but is usually at least 0.001 millimolar, typically from 0.01 to 100 millimolar, and more typically from 0.1 to 50 millimolar.

The organometallic treating composition can be obtained by mixing all of the components at the same time with low shear mixing or by combining the ingredients in several steps. The organometallic compounds are reactive with moisture, and care should be taken that moisture is not introduced with the diluent or adjuvant materials and that mixing is conducted in a substantially anhydrous atmosphere.

Examples of substrates are those which have groups on their surface that are reactive with functional groups associated with the organometallic coating. Examples of such groups are oxide and/or hydroxyl groups. Non-limiting examples of such substrates are those which inherently have such groups on their surface or which form such groups by subsequent treatment such as exposure to the environment or a plasma treatment. Examples of materials which form metal oxide surfaces upon exposure to ambient conditions include steels, including stainless steels, iron, and metals which acquire a non-ablating oxide coating upon exposure to the ambient environment, for example, tantalum, titanium, titanium alloys, aluminum, and aluminum alloys. Additional examples of materials that acquire an oxide layer upon exposure to the ambient conditions are ceramic materials, for example, silicon nitride. Also suitable in the method of the present invention are materials which have an oxide coating imparted to them, for example, thick film oxide insulators in semiconducting devices, and those which can be derivatized to have an oxide surface, for example, gallium arsenide, gallium nitride, and silicon carbide. Other examples include conducting oxides, such as indium tin oxide, deposited on a glass substrate. Also, metal oxides can be deposited on polymer substrates, for example, "stacked" metal oxides on polymer substrates to provide anti-reflective properties. Examples of polymer substrates are those that contain OH or oxide groups, such as acrylic copolymers made from one or more monomers that contain hydroxyl groups. Also, composite inorganic/organic polymers such as organo polymers containing entrained silica and/or alumina may be used. Surprisingly, it has been found that certain polymers that do not adhere well to organometallic coatings such as described in the aforementioned U.S. Pat. No. 6,645,644 adhere very well to the organometallic coatings of the present invention. Examples of such polymers are polycarbonates including aromatic and aliphatic polycarbonates, polyurethanes, polyesters, polyepoxides, acrylic polymers and copolymers (without hydroxyl groups) and polysiloxanes. The polymer can be in the form of a polymer substrate or a polymer coating on a different substrate, for example, a metal or metal oxide with a polymer surface coating, and a polycarbonate substrate such as an ophthalmic lens with a polysiloxane hard coat on its surface.

Preferably, the polymer surface is oxidized such as by subjecting the polymer to an atmospheric plasma treatment in the presence of air before application of the organometallic coating.

As mentioned above, the organometallic compound may be dissolved or dispersed in a diluent and applied by conventional means such as immersion such as dipping, rolling, spraying or wiping to form a film. The transferred organometallic compound is then exposed to conditions sufficient to form a polymeric metal oxide coating in a multilayer configuration with unreacted alkoxide and hydroxyl groups and halide groups. This can be accomplished by depositing the film under conditions resulting in hydrolysis and self-condensation of the alkoxide groups. These reactions result in a polymeric coating being formed that provides cohesive strength to the film. The conditions necessary for these reactions to occur is to deposit the film in the presence of water, such as a moisture-containing atmosphere. The resulting film should also have some unreacted alkoxide groups and/or hydroxyl groups for reaction and possible covalent bonding with the reactive groups on the substrate surface and with possible overlayer material. Concurrently with the self-condensation reaction, the diluent is evaporated. Depending on the reactivity of the functional groups in the organometallic compound and on the substrate surface, heating may be required to bond the organometallic layer to the substrate. For example, temperatures of 50 to 200° C. may be used. However, for readily co-reactive groups, ambient temperatures, that is, 20° C., may be sufficient. Although not intending to be bound by any theory, it is believed the polymeric metal oxide is of the structure:

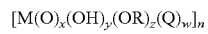

where M is the metal of the invention, R is an alkyl group containing from 1 to 30 carbon atoms; Q is a halide group; x+y+z+w=V, the valence of M; x, y, z and w are at least 1; x=V−y−z−w; y=V−x−z−w; z=V−x−y−w; w=V−x−y−z; n is greater than 2, such as 2 to 1000.

For optical applications, the resulting film typically has a thickness of 5 to 100 nanometers. For other applications, thicker films can be used. When the organometallic compound is used neat and applied by chemical vapor deposition techniques in the absence of moisture, a thin metal alkoxide film is believed to form. Polymerization, if any occurs, is minimized and the film may be in monolayer configuration. When the organometallic compound is subjected to hydrolysis and self-condensation conditions as mentioned above, thicker films with better durability are formed.

The process of the present invention can be used to provide a film or layer that is continuous or discontinuous, that is, in a pattern on the substrate surface. Non-limiting examples include spraying the composition onto a substrate in predetermined areas, for example, by ink-jet printing or stenciling. Other methods may be found by adapting printing techniques, including stamping, lithographing and gravure printing a coating solution onto the substrate in a pattern.

As mentioned above, an overlayer or a different film can be applied to the organometallic film. Such an overlayer material preferably contains groups that are reactive with the alkoxide and/or hydroxyl groups, such as hydroxyl groups or acid groups or derivatives thereof.

Preferably, the overlayer is an organic acid or a derivative thereof. The acid may be a carboxylic acid, a sulfonic acid or a phosphorus acid, such as a phosphoric acid, a phosphonic acid or a phosphinic acid. By derivatives of acids are meant functional groups that perform similarly as acids such as acid salts, acid esters and acid complexes. The organo group of the acid may be monomeric, oligomeric or polymeric. For example, the organo acid may be a monomeric, phosphoric, phosphonic or phosphinic acid.

Examples of monomeric phosphoric acids are compounds or a mixture of compounds having the following structure:

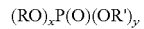

wherein x is 1-2, y is 1-2 and x+y=3, R is a radical having a total of 1-30, preferably 6-18 carbons, where R' is H, a metal such as an alkali metal, for example, sodium or potassium or lower alkyl having 1 to 4 carbons, such as methyl or ethyl. Preferably, a portion of R' is H. The organic component of the phosphoric acid (R) can be aliphatic (e.g., alkyl having 2-20, preferably 6-18 carbon atoms) including an unsaturated carbon chain (e.g., an olefin), or can be aryl or aryl-substituted moiety.

Example of monomeric phosphonic acids are compounds or mixture of compounds having the formula:

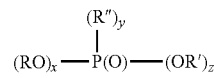

wherein x is 0-1, y is 1, z is 1-2 and x+y+z is 3. R and R" are each independently a radical having a total of 1-30, preferably 6-18 carbons. R' is H, a metal, such as an alkali metal, for example, sodium or potassium or lower alkyl having 1-4 carbons such as methyl or ethyl. Preferably at least a portion of R' is H. The organic component of the phosphonic acid (R and R") can be aliphatic (e.g., alkyl having 2-20, preferably 6-18 carbon atoms) including an unsaturated carbon chain (e.g., an olefin), or can be an aryl or aryl-substituted moiety.

Example of monomeric phosphinic acids are compounds or mixture of compounds having the formula:

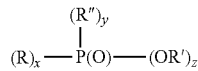

wherein x is 0-2, y is 0-2, z is 1 and x+y+z is 3. R and R" are each independently radicals having a total of 1-30, preferably 6-18 carbons. R' is H, a metal, such as an alkali metal, for example, sodium or potassium or lower alkyl having 1-4 carbons, such as methyl or ethyl. Preferably a portion of R' is H. The organic component of the phosphinic acid (R, R") can be aliphatic (e.g., alkyl having 2-20, preferably 6-18 carbon atoms) including an unsaturated carbon chain (e.g., an olefin), or can be an aryl or aryl-substituted moiety.

Examples of organo groups which may comprise R and R" include long and short chain aliphatic hydrocarbons, aromatic hydrocarbons and substituted aliphatic hydrocarbons and substituted aromatic hydrocarbons. Examples of substituents include carboxyl such as carboxylic acid, hydroxyl, amino, imino, amido, thio, cyano, and fluoro.

Representative of the organophosphorous acids are as follows: amino trismethylene phosphonic acid, aminobenzylphosphonic acid, 3-amino propyl phosphonic acid, O-aminophenyl phosphonic acid, 4-methoxyphenyl phosphonic acid, aminophenylphosphonic acid, aminophosphonobutyric acid, aminopropylphosphonic acid, benzhydrylphosphonic acid, benzylphosphonic acid, butylphosphonic acid, carboxyethylphosphonic acid, diphenylphosphinic acid, dodecylphosphonic acid, ethylidenediphosphonic acid, heptadecylphosphonic acid, methylbenzylphosphonic acid, naphthylmethylphosphonic acid, octadecylphosphonic acid, octylphosphonic acid, pentylphosphonic acid, phenylphosphinic acid, phenylphosphonic acid, bis-(perfluoroheptyl) phosphinic acid, perfluorohexyl phosphonic acid, styrene phosphonic acid, dodecyl bis-1,12-phosphonic acid.

In addition to the monomeric organophosphorous acids, oligomeric or polymeric organophosphorous acids resulting from self-condensation of the respective monomeric acids may be used.

To provide hydrophobic properties to the overlayer, the organo acid or derivative thereof is preferably a fluorinated material, typically a perfluorinated oligomer having a number average molecular weight of less than 2000. The perfluorinated material can be a perfluorinated hydrocarbon of the following structure:

$R_f$—(CH$_2$)$_p$—X where $R_f$ is a perfluorinated alkyl group or a perfluorinated alkylene ether group and p is 2 to 4, preferably 2.

Examples of perfluoroalkyl groups are those of the structure:

where Y is F or $C_nF_{2n+1}$; m is 4 to 20 and n is 1 to 6.

Examples of perfluoroalkylene ether groups are those of the structure:

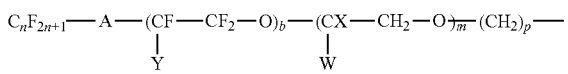

where A is an oxygen radical or a chemical bond; n is 1 to 6; Y is F or $C_nF_{2n+1}$; b is 2 to 10; W is H, F, $C_nH_{2n}$ or $C_nF_{2n}$; m is 0 to 6, and p is 0 to 18.

X is an acid group or an acid derivative. Preferably, X is:

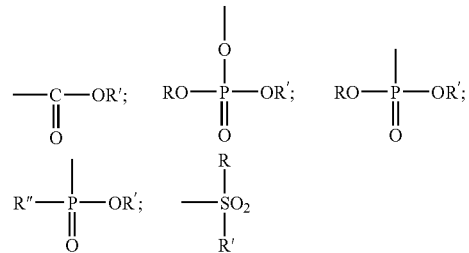

where R and R" are a hydrocarbon or substituted hydrocarbon radical having up to 200, such as 1 to 30 and 6 to 20 carbons, R can also include the perfluoroalkyl groups mentioned above, and R' is H, a metal such as potassium or sodium or an amine or an aliphatic radical, for example, alkyl including substituted alkyl having 1 to 50 carbons, preferably lower alkyl having 1 to 4 carbons such as methyl or ethyl, or aryl including substituted aryl having 6 to 50 carbons.

Examples of fluorinated materials are esters of perfluorinated alcohols such as the alcohols of the structure:

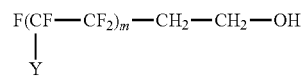

where Y is F or $C_nF_{2n+1}$; m is 4 to 20 and n is 1 to 6.

Examples of suitable esters are stearates and citrates of such alcohols. Such materials are available from E. I. du Pont de Nemours and Company under the trademark ZONYL FTS and ZONYL TBC.

For application to the surface of the substrate, the overlayer material is dissolved in a liquid diluent. The concentration of the overlayer material is typically dilute, for example, no greater than 10 percent on a weight/volume basis for solid overlayer material and 10 percent on a volume/volume basis for oil and liquid overlayer material, and preferably is within the range of 0.01 to 1.0 percent. The percentages are based on total weight or volume of the solution.

Examples of suitable diluents are hydrocarbons such as hexane, isooctane and toluene; ketones such as methyl ethyl ketone; alcohols such as methanol and ethanol; ethers such as tetrahydrofuran. Fluorinated solvents such as nonafluorobutylmethyl ether and fluorinated solvents available as HFE-7100, supplied by 3M Innovative Products and perfluorinated ethers supplied by Solvay Solexis under the trademark GALDEN are preferred for use with the fluorinated material. The fluorinated solvents can be used in admixtures with the other solvents mentioned above. The fluorinated solvents or diluents are different from the fluorinated materials in that the fluorinated solvents or diluents are not film formers, whereas the fluorinated materials are. Preferably, the vapor pressure of the diluent is high, permitting rapid evaporation at room temperature (20-25° C.). The overlayer material can be dissolved easily upon adding the overlayer material to the diluent.

The solution of the overlayer material can be applied to the surface of the optical article by dipping, rolling, spraying or wiping. After application of the overlayer material, the diluent is permitted to evaporate, with or without wiping during evaporation, preferably at ambient temperature, or optionally by the application of heat.

The resultant layer typically is thin, having a thickness of about 100 nanometers or less. The fluorinated overlayers are hydrophobic, having a water contact angle greater than 70°, typically from 75-130°. The water contact angle can be determined using a contact angle goniometer such as a TANTEC contact angle meter Model CAM-MICRO.

EXAMPLES

The following examples show various coated articles and methods for their preparation in accordance with the invention. All parts are by weight unless otherwise indicated.

Example 1

A polycarbonate lens with a polysiloxane/acrylate hardcoat was first oxidized using an electrical plasma source (Lectro-Tec) for 10 seconds. To coat the lens with an extremely thin layer of a polymeric tantalum metal oxide having alkoxide, chloride and hydroxide ligands, the lens was dipped into a 1 g/L solution of tantalum (V) chloride in isopropanol and withdrawn at a rate of 2 cm/min. The lens was then dipped in a 0.1% solution of poly(hexafluoropropyleneoxide)-monophosphonic acid, or "p(HFPO)PA", in 5% HFE-7100 (3M Innovative Products)/95% methanol and ultrasonicated for 5 minutes. The lens was then withdrawn at a rate of 2 cm/min and tested for water contact angle. The water contact angle was determined using a contact angle Goniometer TANTEC Contact Angle Meter, Model CAM-MICRO. The water contact angle was 118 indicative of a very hydrophobic coating.

Example 2

In a manner similar to Example 1, a lens was coated with a polymeric molybdenum metal oxide having isopropoxide, chloride and hydroxide ligands and overcoated with p(HFPO)PA. The water contact angle was 118.

Example 3

In a manner similar to Example 1, a lens was coated with a polymeric zirconium metal oxide having dipropylene alkoxide, chloride and hydroxide ligands and overcoated with p(HFPO)PA. The water contact angle was 118.

Example 4

In a manner similar to Example 1, a lens was coated with a polymeric titanium metal oxide having dipropylene alkoxide, chloride and hydroxide ligands and overcoated with p(HFPO)PA. The water contact angle was 116.

Example 5

In a manner similar to Example 1, a lens was coated with a polymeric titanium metal oxide having isopropoxide, chloride and hydroxide ligands and overcoated with p(HFPO)PA. The water contact angle was 118.

The invention is now set forth in the following claims.

What is claimed is:

1. A method of depositing an organometallic coating to a substrate comprising:
    (a) contacting the surface of the substrate with a metal compound having both halide and alkoxide ligands so as to deposit a film on the substrate surface,
    (b) exposing the film to conditions sufficient to form a polymeric metal oxide with alkoxide and hydroxyl ligands;
the method being further characterized such that the substrate prior to deposition has groups on its surface that are reactive with the alkoxide and/or hydroxyl groups of the polymeric metal oxide.

2. The method of claim 1 in which the halide ligand is chloride.

3. The method of claim 1 in which the film is exposed to conditions resulting in hydrolysis and self-condensation of the alkoxide group.

4. The method of claim 3 in which the conditions sufficient are exposure of the film to a moisture-containing atmosphere.

5. The method of claim 1 in which the metal is selected from Ti, Zr, La, Hf, Ta and W.

6. The method of claim 1 in which the substrate is selected from a metal, metal oxide, metalloid, polymer, ceramic and glass.

7. The method of claim 1 in which the groups on the surface of the substrate prior to deposition are oxide and/or hydroxyl groups.

8. The method of claim 7 in which the polymeric metal oxide is covalently bonded to the substrate.

9. The method of claim 8 in which the covalent bond is formed through reaction of the surface oxide and/or hydroxyl groups with alkoxide and/or hydroxyl groups associated with the polymeric metal oxide.

10. The method of claim 1 which includes an additional step of applying a different film to the polymeric metal oxide film.

11. The method of claim 10 in which the different film is deposited from an organophosphorus acid.

12. The method of claim 11 in which the organophosphorus acid is a phosphonic acid.

* * * * *